3,344,896
CLUTCH-CONTROLLED REVERSIBLE OR MULTI-SPEED POWER-TRANSMITTING MECHANISM
Norman A. Rasmussen, Mercer Island, Wash., assignor to Pacific Car and Foundry Company, a corporation of Washington
Filed May 7, 1965, Ser. No. 454,037
17 Claims. (Cl. 192—3.5)

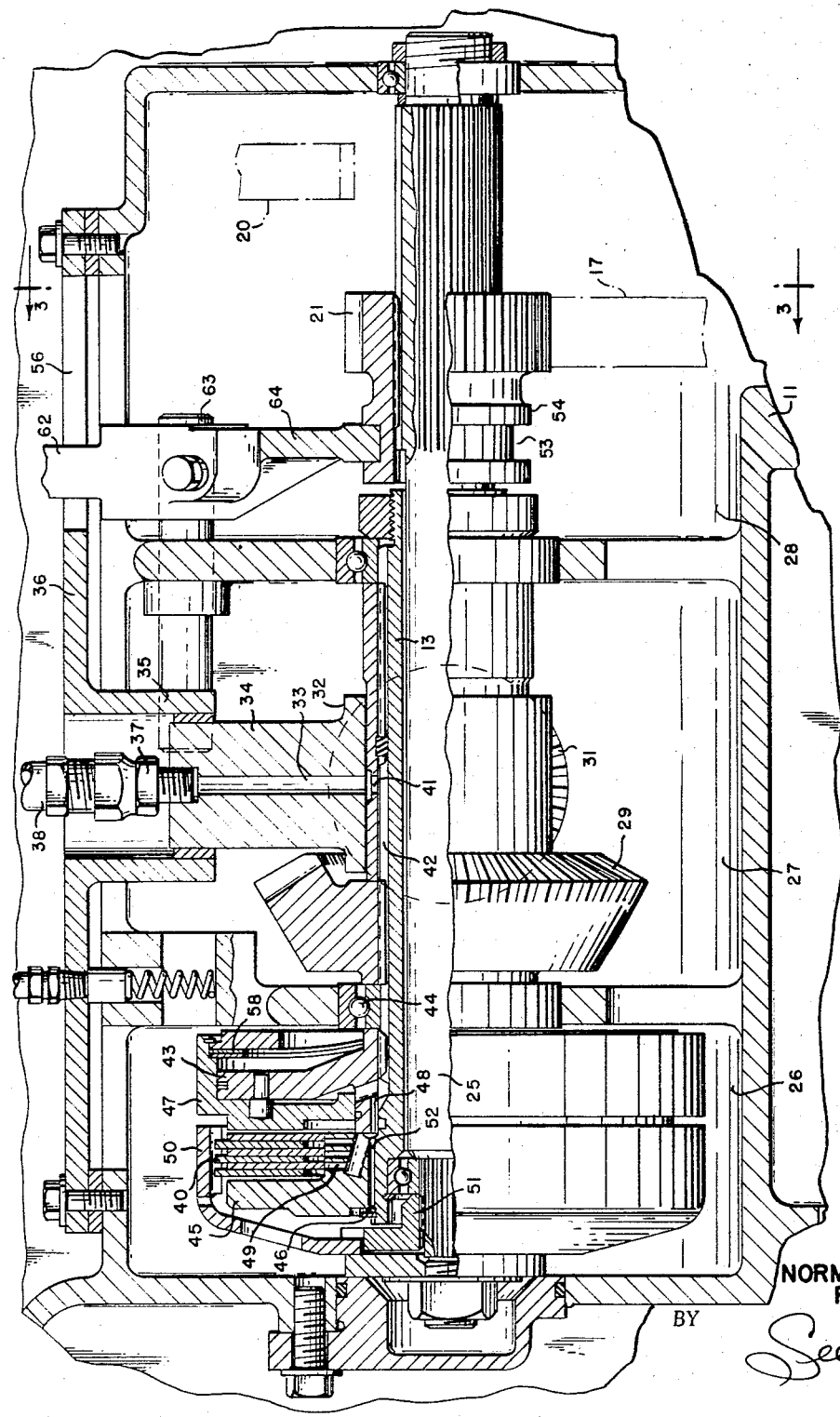

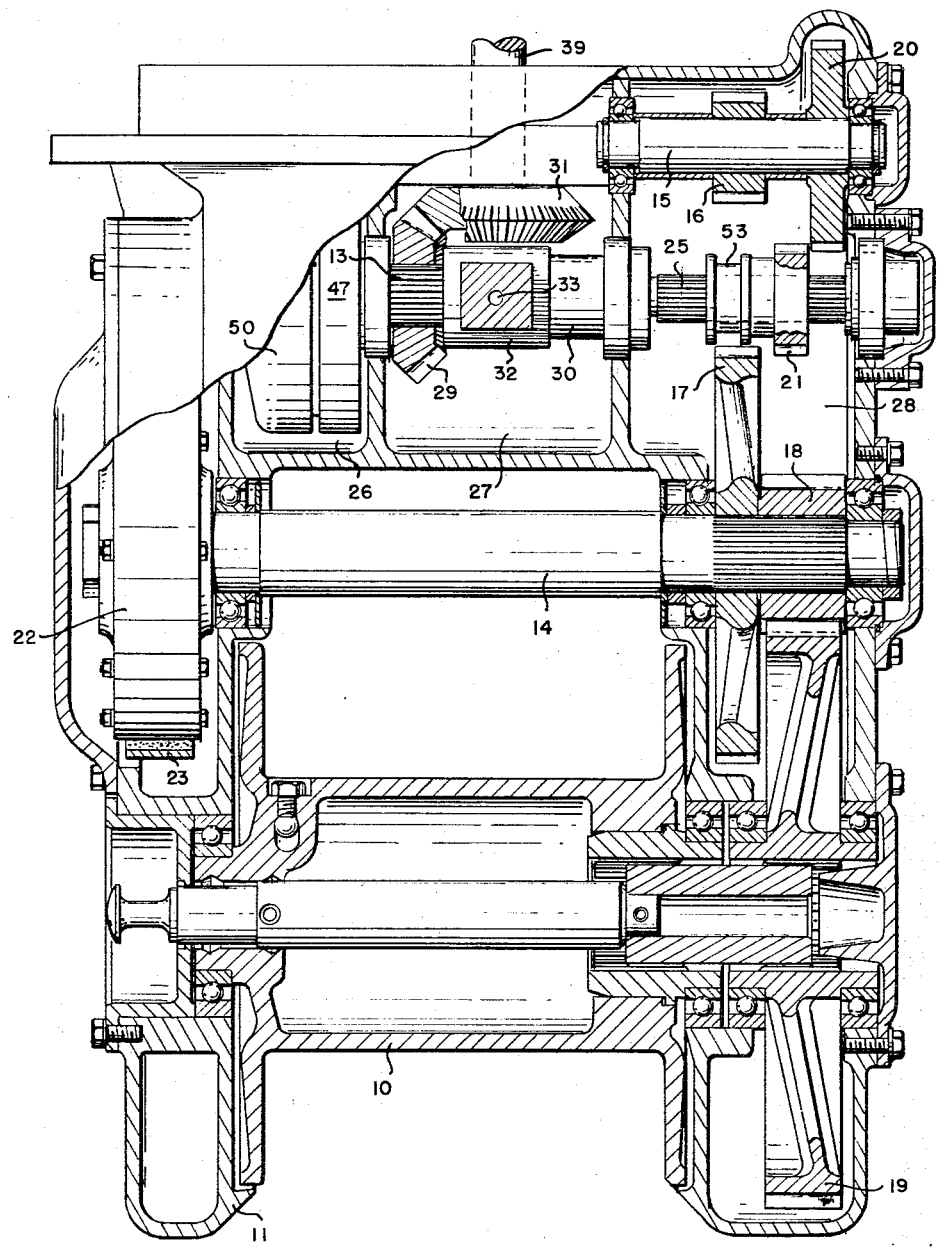
FIG__2

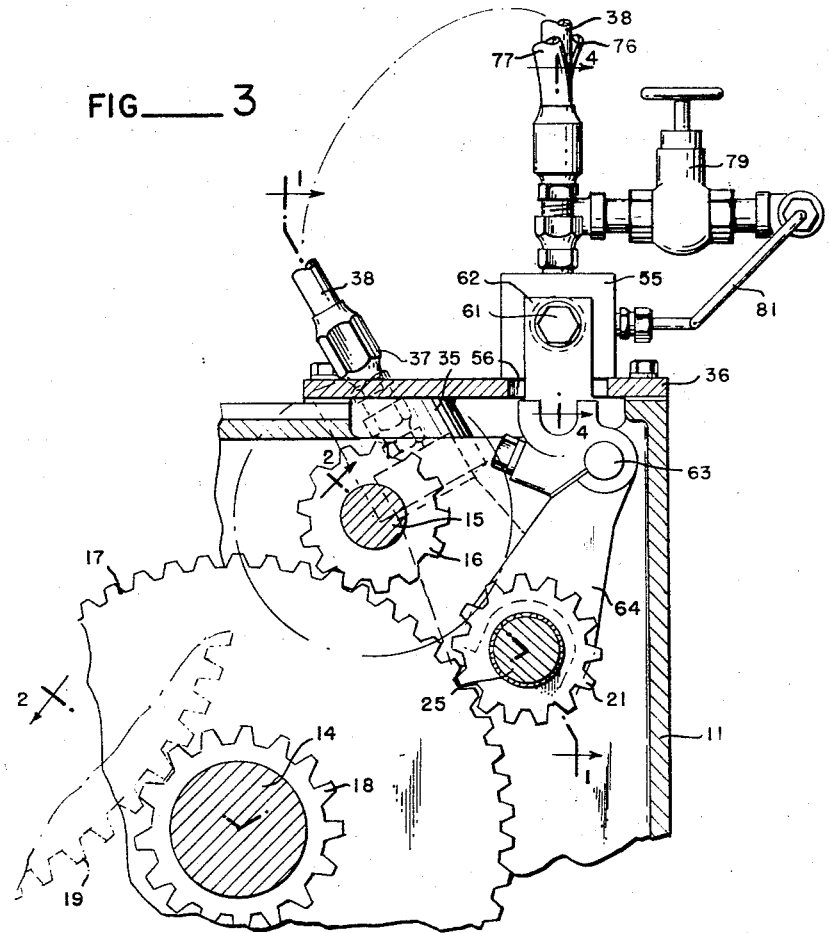
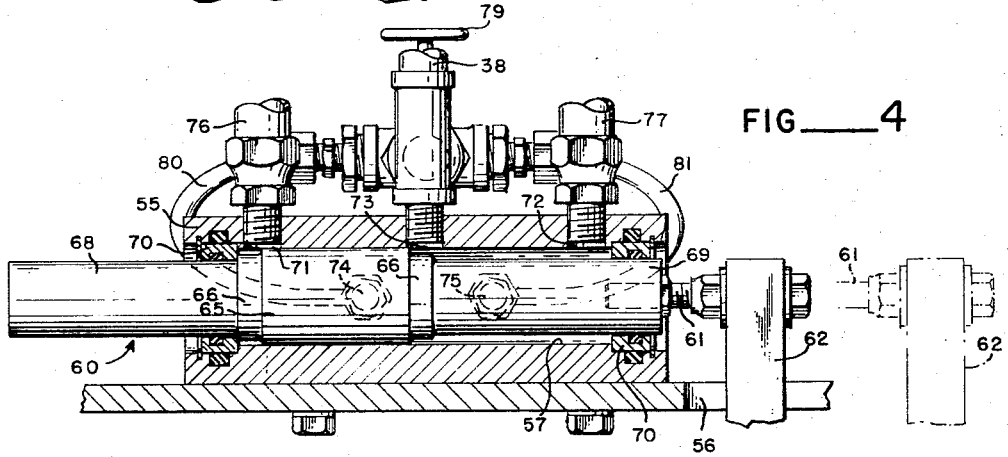

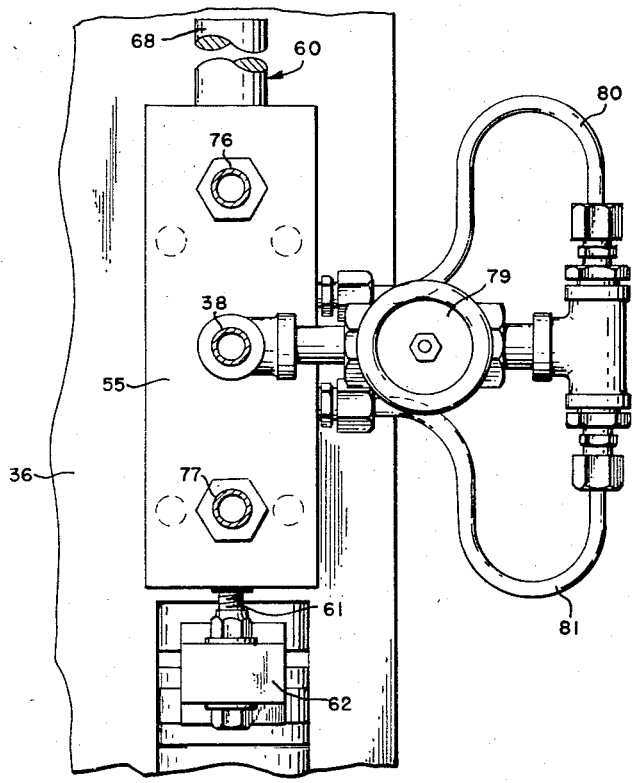
FIG__5
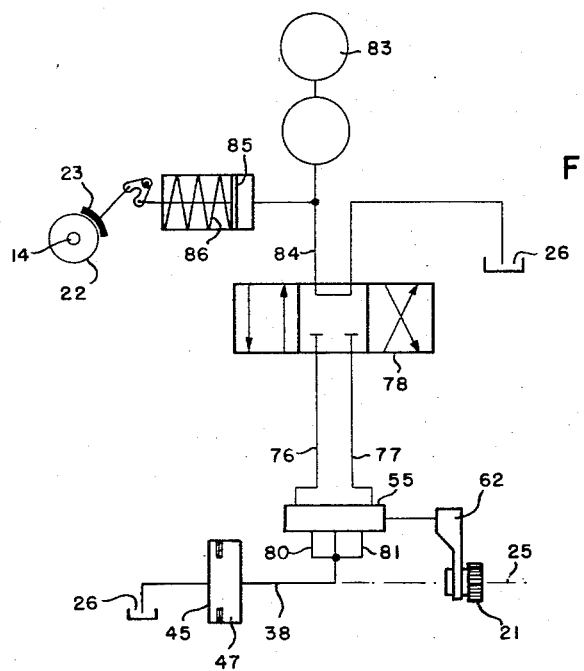
FIG__6
NORMAN A. RASMUSSEN
INVENTOR.
BY Seed & Berry
ATTORNEYS United States Patent Office 3,344,896
Patented Oct. 3, 1967

This invention relates to clutch-controlled power-transmitting mechanism, and particularly mechanism for transmitting power at different speed ratios or in forward or reverse, selectively.

Especially having in mind transmission of power from the auxiliary take-off (PTO) of a power plant to the winding drum of a winch, it is a principal object of the invention to perfect a mechanism in which the instrumentality for making the selection of the speed ratio and/or the direction in which the drum is driven is comprised of a sliding gear. The sliding gear permits power to be fed through only a single clutch in passing between the input and the output ends of the transmission mechanism. Where a separate clutch, as distinguished from a sliding gear, is employed for reversing a drive, space limitations can dictate the use of a small clutch. A single heavy-duty clutch permits full power in reverse. Applied to a winch, this is significant in that it permits the reversed spooling drum to be employed for lowering a load rather than being restricted to the light duty of simply paying out rope.

A further important object of the invention is to provide a power transmitting mechanism of the described character in which the activation of the sliding gear and the clutch is made responsive to hydraulic pressure.

As a further object still the invention aims to provide a power transmitting mechanism of the described character in which the sliding gear is caused to move in either direction to the extreme limit of its sliding travel, thus to fully mesh the related driven gear of a gear train, before the clutch becomes fully engaged.

The invention has the yet additional object of providing a power transmitting mechanism embodying a perfected control system for shifting said sliding gear, one which provides neutral as well as forward and reverse positions, and which permits the spooling drum to be "inched" without having to shift the sliding pinion out of its fully meshed position with the related driven gear of the gear train.

The foregoing and other more particular objects and advantages of the invention will appear and be understood in the course of the following description and claims, the invention consisting in the novel construction and in the adaptation and combination of parts hereinafter described and claimed.

In the accompanying drawings:

FIGURE 1 is a fragmentary longitudinal vertical sectional view showing teachings of the present invention embodied in a winch as a means of controlling the direction of drive, the section line being shown at 1—1 in FIG. 3.

FIG. 2 is a fragmentary longitudinal vertical sectional view on the jogged section line 2—2 of FIG. 3.

FIG. 3 is a fragmentary transverse vertical sectional view on line 3—3 of FIG. 1.

FIG. 4 is a fragmentary longitudinal vertical sectional view on line 4—4 of FIG. 3.

FIG. 5 is a fragmentary top plan view of the structure shown in FIG. 4 with supply and delivery hoses for pressure oil shown in section; and FIG. 6 is a schematic illustration showing the hydraulic circuitry for the winch.

It is here noted that the teachings of the invention may be applied either to change speed ratios and/or to change the direction in which a rotary member is driven. For purposes of illustration the invention is shown employed to drive the spooling drum of a winch in either "forward" or "reverse," selectively.

Referring to said drawings, the numeral 10 denotes the spooling drum, and 11 a case providing a journal for the drum. A clutch shaft 13, a brake shaft 14, and a back gear shaft 15 are journaled within the case for rotation about spaced axes paralleling the rotary axis of the drum. A pinion 16 fixed to the back gear shaft meshes a gear wheel 17 fixed to the brake shaft, and a pinion 18 fixed to the brake shaft meshes a bull gear 19 having a driving connection with the drum. These gears together with a back gear 20 fixed to the back gear shaft, and a sliding pinion 21 hereinafter to be described, produce a reduction train for driving the spooling drum in "forward." The "reverse" reduction train by-passes the back gear shaft, and which is to say that the drive is passed directly from the sliding gear to the gear wheel 17 and thence by pinion 18 to the bull gear. A brake drum 22 is carried by the brake shaft upon the end thereof opposite the gear wheel 17. Functional to the brake drum is a spring-set hydraulically-released brake 23.

The clutch shaft 13 is tubular. A shaft 25 for driving the sliding gear and hereinafter termed the pinion shaft is received through the hollow center of the clutch shaft. The portion of the case occupied by said shafts 13 and 25 is divided by apertured walls into three connecting compartments 26, 27 and 28. Within the center compartment 27 and splined to the clutch shaft so as to turn therewith are a collector sleeve 30 and a bevel gear 29. The bevel gear is driven by a bevel gear 31 fixed upon the end of a PTO shaft 39. The collector sleeve has a journal fit within the hollow center of a collector ring 32 and presents a circumferential groove registering with a passage-way 33 drilled through the center of a spoke 34 projecting radially from the ring. The other end of the spoke fits with a neck 35 provided by a cover plate 36 and makes connection by a fitting 37 with a delivery pipe 38 leading from an actuator. By the operation of said actuator, hereinafter to be described, hydraulic fluid under pressure is delivered through pipe 38 and the passage-way 33 to the circumferential groove of the collector sleeve and thence feeds by radial ports 41 to the hollow center of the collector sleeve.

Surface grooves 42 provided by the clutch shaft 13 for the spline fit of the input gear 29 and the collector sleeve 30 are cut deeper than would be otherwise necessary, and the hydraulic fluid channels along these grooves into an expandible chamber formed between the components of a clutch-activating piston-cylinder assembly. The piston 43 therefor is splined to the clutch shaft, being held against endwise motion by the engagement of one end of this hub against the inner race of a bearing 44 and by the engagement of the other end of its hub against a head-piece 45 secured by splines 52 upon the extreme end of the clutch shaft. A snap-ring 46 holds the head-piece against outwardly directed endwise thrust. The cylinder 47 for the piston turns in concert with the piston, receiving a journal for endwise slide motion upon the hub of the piston at the end of the latter which faces the head-piece. A set of clutch plates 40 is received between opposing faces of the cylinder 47 and the head-piece 45. Clutch-engaging movement of the cylinder member 47 is yieldingly opposed by a spring 58. Alternate plates are conventionally connected the one to the hub of the head-piece by keys and the other by a spline fit to the surrounding flange 50 of a drive wheel. The drive wheel is splined upon a collar 51 which is in turn splined to the pinion shaft 25.

The piston 43 has a longitudinal hole 48 in its center connecting the expandible chamber of the piston-cylinder assembly with radial holes 49 leading to the annular space containing the clutch plates. Surfaces of the friction plates (those with external teeth) are "waffled," so that some oil can always escape between the plates. The function of this arrangement is to provide for the flow of a controlled quantity of oil to lubricate and cool the clutch plates, and to permit dissipation of clutch-engaging pressure upon an interruption in the flow of hydraulic fluid through the delivery pipe 38. Such flow is continuous while the clutch is engaged. The interior of the case 11 serves as a reservoir from which hydraulic fluid is pumped for the activation of the control mechanism for the winch.

The sliding pinion 21 occupies the compartment 28 and is splined for endwise sliding motion upon an end of the pinion shaft 25 exposed beyond the clutch shaft 13. The slide motion is between two extremes one of which meshes the sliding gear with the back gear 20 and the other of which meshes the sliding gear with the gear wheel 17. A circumferential groove 53 is provided in a reduced neck portion 54 of the sliding pinion.

Now describing the actuator, the same provides a through-bored chest 55 which is bolted upon the cover plate to lie beyond one end of an opening 56 which gives access to the compartment 28 and such that the axial line of its bore 57 parallels the axis of the clutch shaft. A spool 60 is received for shuttle motion in said bore of the chest and is prolonged at the end thereof proximal to the opening 56 by a center-bolt 61. Below the actuator, and journaled in the case 11 for endwise slide movement along an axis paralleling the slide axis of the spool 60, is a pin 63. A shift arm 64 is affixed to the pin, and has its lower end forked to engage the groove 53 of the sliding pinion. An upward prolongation of the shift arm is received through said opening 56 and connects with the center-bolt 61.

The spool is stepped to provide a land portion 65 at the center, comparatively short necks, at 66, at each end of the land portion, and rather long reduced ends 68 and 69 beyond the necks. The several steps are each cylindrical and concentric.

The chest 55 is counter-bored at each of its two ends and has a respective stop sleeve 70 received in each of said counter-bores. These sleeves fit the reduced ends of the spool and by the shouldering engagement of the necks 66 limit the shuttle movement of the spool. The counter-bores and the internal surfaces of the stop sleeves are sealed against fluid leakage by O-rings. The length of the bore 57 somewhat exceeds twice the length of the spool's land portion 65. Inlet ports, as 71 and 72, are provided in the wall of the bore at each of the two ends thereof. An outlet port 73 is provided at the center of the bore. There are also provided two additional outlet ports 74 and 75 spaced toward the ends of the bore a moderate distance from the center port 73. The inlet ports 71 and 72 connect by hoses 76 and 77 with the appropriate outlet ports of a 3-position (forward, neutral, reverse) hydraulic directional control valve 78 (FIG. 6). The outlet port 73 leads by the delivery pipe 38 to the clutch. Said outlet ports 74 and 75 connect by pipes 80 and 81 with the delivery pipe 38 but pass through a regulating valve 79 to produce a flow which is chocked below the flow capacity of the port 73, albeit being greater than the combined flow capacity of the clutch's radial holes 49.

It should be noted that the ends of the teeth on the sliding pinion, the back gear, and the reduction gear wheel 17 are chamfered to permit easy engagement.

Tracing the operation, and assuming that the control valve 78 is placed in "forward," i.e. shifted to the right as viewed in FIG. 6, filtered oil is then supplied under the pressure influence of pump 83 through the line 84 to the hose 76 and fed thereby to the left-hand end of the actuator chest. The actuator spool, responsively moving from left to right, acts through the shifter fork to move the sliding pinion into engagement with the back gear. Before the spool reaches the end of its stroke it uncovers the port 74. Oil is now free to flow to the clutch through lines 80 and 38. As pressure now builds up within the clutch, an equal or greater pressure is maintained in the chest. This causes the actuator spool to continue to the end of its stroke, but fully uncovers port 73 to responsively obtain the full engagement of the clutch only after the sliding pinion has become fully meshed with the back gear. As the pressure builds up in the clutch it also builds up in the line 84 so that the piston 85 of the brake actuator, overpowering the spring 86, releases the brake 23 essentially at the same time the clutch becomes engaged.

When the control valve 78 is placed in "neutral," oil flow to the actuator chest is blocked off. Oil in the clutch cylinder dissipates through the passage 48 and the holes 49. The clutch responsively disengages by action of the spring 58 and, simultaneously, the oil pressure drops within the line 84 so that the spring 86 asserts its force to apply the brake 23 and stop the winch drum.

Both ports on the output side of the control valve 78 are blocked when the valve is in "neutral," hence the sliding pinion remains in mesh from the fact that the spool could back off from its right-hand position only against vacuum which would be thereby created. This permits the winch to be "inched" (i.e. forward, neutral, forward, neutral, etc.) without having to take the sliding pinion out of mesh with the back gear.

It can develop that when said shift of the control valve 78 from "neutral" to "forward" is made, and assuming that the sliding pinion has been at the "reversing" extreme of its sliding travel, namely in mesh with the reduction gear wheel 17, the teeth of the sliding pinion may contact the teeth of the back gear head-on. The teeth will not then immediately mesh. When the sliding pinion is in this position the actuator spool will have uncovered the port 74 of the chest. Since the forward motion of the spool has been stopped, pressure builds up within the chest and forces a small quantity of oil into the clutch. The volume and pressure is insufficient to cause a full engagement of the clutch but it does cause clutch drag, making the driven element of the clutch start to turn. As soon as the sliding pinion rotates enough for its teeth to register with the interstices between the teeth of the back gear, the actuator spool moves the pinion into mesh. The force imposed by the actuator spool easily overcomes the sliding friction between the teeth created by the clutch drag.

While the actuator-pinion package is basically a binary module, use of a 3-position control valve provides a "neutral" complement therefor. It is indicated that the use of a number of the modules, with appropriate hydraulic control devices, could be installed in a gear train, in series and/or parallel, so as to give an almost endless variety of directions and speeds to the output shaft or shafts.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In power-transmitting mechanism, a normally disengaged clutch caused to be engaged by application of hydraulic pressure, a drive to the input end of said clutch, a pinion mounted for reciprocal slide motion along a prescribed path which is endwise to its axis, a rotary shaft driven from the output end of the clutch and connected with the pinion so that the pinion turns with the shaft, two driven gears mounted so as to be meshed by the sliding pinion one at one extreme and the other at the other extreme of the pinion's slide travel, an actuator comprising a chest and a shuttling spool mounted for slide movement in the chest, said chest having a respective admission port for hydraulic fluid at each of its two ends and a fluid-emission port at the center, the spool being so formed that the pressure of admitted fluid through a selected end port moves the spool to the opposite end of its shuttle travel and uncovers the center port upon reaching said limit of travel, an operative connection from the spool to the sliding pinion acting to slide the pinion into mesh with the driven gears, selectively, one gear as the spool moves to one extreme of its shuttle travel and the other gear as the spool moves to the opposite extreme, a pressure source of hydraulic supply, means for feeding hydraulic fluid from said supply source to either end port of the chest, selectively, while dumping hydraulic fluid from the opposite end port, a connection between the center port of the chest and the clutch serving to supply pressure fluid to the clutch and responsively engage the same when the spool uncovers said center port, and means for dissipating fluid pressure from the clutch when said center port is covered.

2. Structure according to claim 1 having a spring-set brake functional to said driven gears, means being provided for releasing the brake, against yielding pressure imposed by the spring, simultaneously with the engagement of the clutch.

3. Structure according to claim 2 having a winch drum driven through reduction gearing from said gears which are driven by the sliding pinion.

4. Structure according to claim 1 having a 3-position control valve between the source of pressure supply and the actuator chest operative when occupying two of said positions to establish said conditions of pressure feed and dump which are responsible for shuttling the spool, and when occupying the third position to block off both of said end ports and by said blocking establish a hydraulic lock for the actuator.

5. Structure according to claim 1 in which the clutch turns in a bath of oil, the dissipation of fluid pressure from the clutch being accomplished by dumping into said oil bath.

6. Structure according to claim 1 in which the means for dissipating fluid pressure from the clutch comprises a constantly open dump passage having a flow capacity less than the connection which leads from the chest to the clutch.

7. Structure according to claim 6 in which a housing for the clutch serves as a reservoir from which the pressure source of supply draws its hydraulic fluid, the dump passage discharging into said housing.

8. Structure according to claim 1 in which the chest provides two additional fluid-emission ports each connected with the clutch, so as to supply pressure fluid thereto, by a passage of choked flow capacity and each so placed as to be uncovered by the spool momentarily in advance of the latter's uncovering of the central fluid-emission port as the spool moves toward a respective end limit of its shuttle travel.

9. Structure according to claim 8 in which the placement of said additional fluid-emission ports is so related to the travel of the sliding pinion that the uncovering of said additional ports coincides with the initiation of a meshing action between the sliding pinion and a respective one of said driven gears.

10. Structure according to claim 8 having a spring-set brake functional to said driven gears, means being provided for releasing the brake, against yielding resistance imposed by the spring, simultaneously with the engagement of the clutch.

11. In power-transmitting mechanism, a normally disengaged clutch caused to be engaged by application of hydraulic pressure, a drive to the input end of said clutch, a pinion mounted for reciprocal slide motion along a prescribed path which is endwise to its axis, a rotary shaft driven from the output end of the clutch and connected with the pinion so that the pinion turns with the shaft, two driven gears mounted so as to be meshed by the sliding pinion one at one extreme and the other at the other extreme of the pinion's slide travel, an actuator comprising a chest and a shuttling spool mounted for slide movement in the chest, a pressure source of hydraulic supply, a 3-position control valve so connected with said pressure source of supply and the chest that when occupying two of said positions, pressure fluid is fed to respective ends of the chest and responsively moves the spool to the opposite end, and when occupying a third position isolates the chest from the source of supply and at the same time establishes a vacuum lock in the end of the chest then occupied by the spool, a connection from the chest to the clutch operating when the control valve occupies either of said first two positions and the spool has responsively moved to either of its end limits of travel to supply pressure fluid from the chest to the clutch for the engagement thereof, and an operative connection from the spool to the sliding pinion acting to slide the pinion into mesh with the driven gears, selectively, one gear as the spool moves to one extreme of its shuttle travel and the other gear as the spool moves to the opposite extreme.

12. Mechanism according to claim 11 in which the presure fluid responsible for engaging the clutch is fed from the chest to an expandible chamber, said chamber being provided with a constantly open dump passage of restricted flow capacity.

13. Mechanism according to claim 12 in which the clutch turns in a bath of said pressure fluid, the dump passage discharging into said bath.

14. In power-transmitting mechanism, a normally disengaged clutch caused to be engaged by application of hydraulic pressure, a drive to the input end of said clutch, a chest, a shuttling spool mounted for slide movement in the chest, a pressure source of hydraulic supply, a 3-position control valve so connected with said pressure source of supply and the chest that when occupying two of said positions, pressure fluid is fed to respective ends of the chest and responsively moves the spool to the opposite end, and when occupying a third position isolates the chest from the source of supply and at the same time establishes a vacuum lock in the end of the chest then occupied by the spool, and a connection from the chest to the clutch operating when the control valve occupies either of said first two positions and the spool has responsively moved to either of its end limits of travel to supply pressure fluid from the chest to the clutch for the engagement thereof.

15. In power-transmitting mechanism, a member adapted to be shifted into either of two operating positions, a chest, a shuttling spool mounted for slide movement in the chest, said chest having a respective admission port for pressure fluid at each of its two ends and a fluid-emission port at the center, the spool being so formed that when the same is moved to either end of the chest it uncovers the fluid-emission port, a pressure source of fluid supply, a 3-position control valve so connected with said pressure source of supply and the chest that when occupying two of said positions, pressure fluid is fed through the related admission port to respective ends of the chest and responsively moves the spool to the opposite end, and when occupying a third position isolates the chest from the source of supply and at the same time establishes a vacuum lock in the end of the chest then occupied by the spool, and a mechanical connection from the chest to the shiftable member operating when the control valve occupies one of said first two positions and the spool has responsively moved to one of its end limits of travel to shift the shiftable member into one of its operating positions and when the control valves occupies the other of said first two positions and the spool has responsively moved to the other of its end limits of travel to shift the shiftable member into the other of its operating positions.

16. Mechanism as claimed in claim 15 in which the shiftable member is a rotary driving member, and having a means for driving said driving member connected therewith by a fluid applied friction clutch so connected with the chest that pressure fluid is delivered to the clutch for its engagement only when the spool of the control chest is subjected to the pressure of the supply source.

17. Means for transmitting power from a power plant selectively to either of two separated driven rotary members comprising, in combination with a rotary driving member mounted for shuttling movement between two positions in one of which a driving connection is established from the driving member to one of the driven members and in the other of which a driving connection is established from the driving member to the other driven member: a fluid applied friction clutch having its input end driven from the power plant and its output end driving said driving member, a mechanical connection to the driving member for moving the same to either of said two driving positions selectively, a means actuated by pressure fluid for operating the mechanical connection, a common source of pressure fluid for the clutch and the means which operates the mechanical connection, and means for supplying pressure fluid from the source to the clutch only after the same has been supplied to said fluid actuated means which activates the mechanical connection.

References Cited

UNITED STATES PATENTS

| 2,189,679 | 2/1940 | Sanford | 192—3.5 |
| 2,272,571 | 2/1942 | Maybach | 192—3.5 X |
| 2,675,897 | 4/1954 | Wilson | 192—3.5 |
| 2,979,176 | 4/1961 | Voth | 192—109 X |

OTHER REFERENCES

Ser. No. 272,652, Egersdorfer (A.P.C.), published April 1943.

BENJAMIN W. WYCHE III, *Primary Examiner.*